United States Patent [19]
Van Peteghem et al.

[11] Patent Number: 5,690,329
[45] Date of Patent: Nov. 25, 1997

[54] STACK OF IMAGE RECEIVING SHEETS WITH DETECTION MARK

[75] Inventors: Willy Van Peteghem, Edegem; Eric Goos, Mortsel; Jan Zwijsen, Wilrijk, all of Belgium

[73] Assignee: Agfa-Gevaert N.V., Mortsel, Belgium

[21] Appl. No.: 363,280

[22] Filed: Dec. 22, 1994

[30] Foreign Application Priority Data

Jan. 24, 1994 [EP] European Pat. Off. ............ 94200162

[51] Int. Cl.$^6$ ........................................... B65H 7/02
[52] U.S. Cl. ............... 271/227; 271/258.01; 271/259; 271/265.01; 271/265.02; 400/708; 206/215; 206/223
[58] Field of Search ............... 271/1, 110, 111, 271/145, 265.01, 265.02, 265.07, 227, 258.01, 259, 261, 258.04; 400/624, 703, 708, 693, 693.1; 206/215, 576, 229, 223, 449

[56] References Cited

U.S. PATENT DOCUMENTS

| | | | |
|---|---|---|---|
| 1,495,050 | 5/1924 | Warner | 206/215 |
| 4,555,213 | 11/1985 | Tamura et al. | 271/1 X |
| 4,876,706 | 10/1989 | Tajima | |
| 5,149,078 | 9/1992 | Matsuda et al. | |
| 5,196,868 | 3/1993 | No et al. | 271/227 X |
| 5,228,678 | 7/1993 | Matsuda et al. | |
| 5,314,179 | 5/1994 | Oda et al. | 271/145 |

FOREIGN PATENT DOCUMENTS

| | | | |
|---|---|---|---|
| 0231834 | 1/1987 | European Pat. Off. | |
| 59-209167 | 11/1984 | Japan | |
| 244718 | 12/1985 | Japan | 271/145 |
| 17750 | 1/1988 | Japan | 271/261 |
| 243424 | 9/1990 | Japan | 271/145 |

*Primary Examiner*—Boris Milef
*Attorney, Agent, or Firm*—Brumbaugh, Graves, Donohue & Raymond

[57] ABSTRACT

A stack of image receiving sheets, wherein each image receiving sheet has on one side of a support an image receiving layer, includes a cover sheet protecting the image receiving layer of an outermost image receiving sheet. The cover sheet has a detection mark distinguishing it from the image receiving sheets.

4 Claims, 12 Drawing Sheets

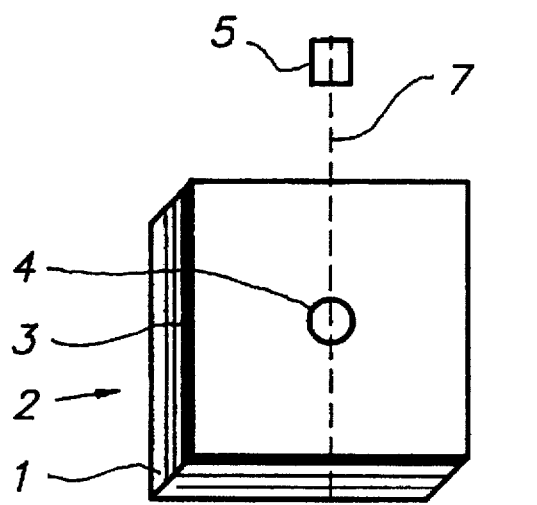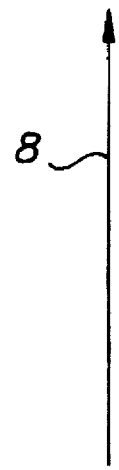
FIG. 3.1
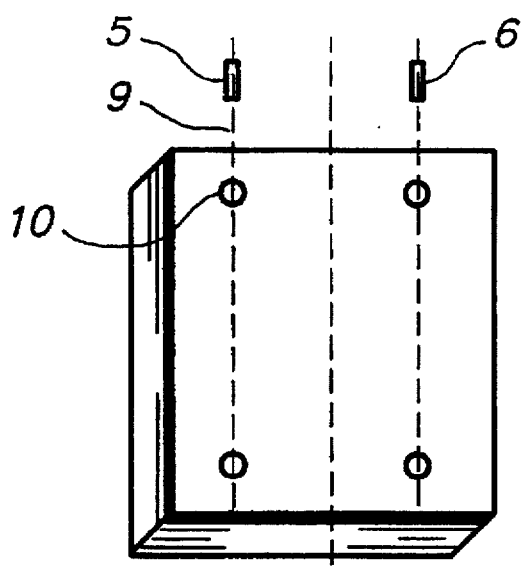
FIG. 3.2

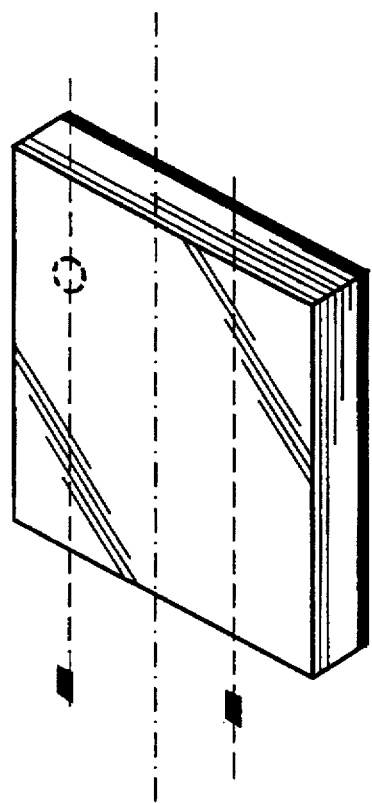
FIG. 4.4
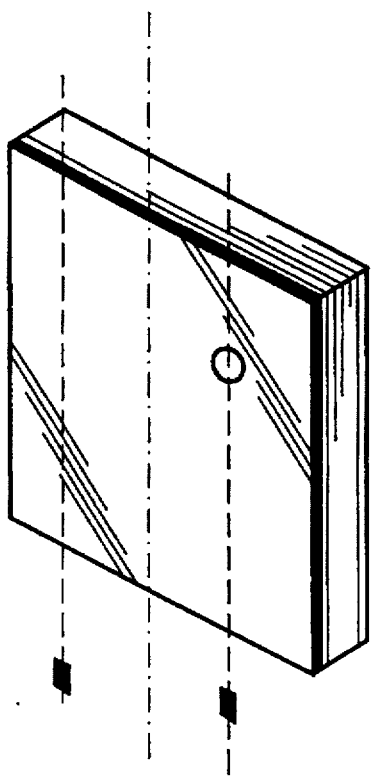
FIG. 4.3
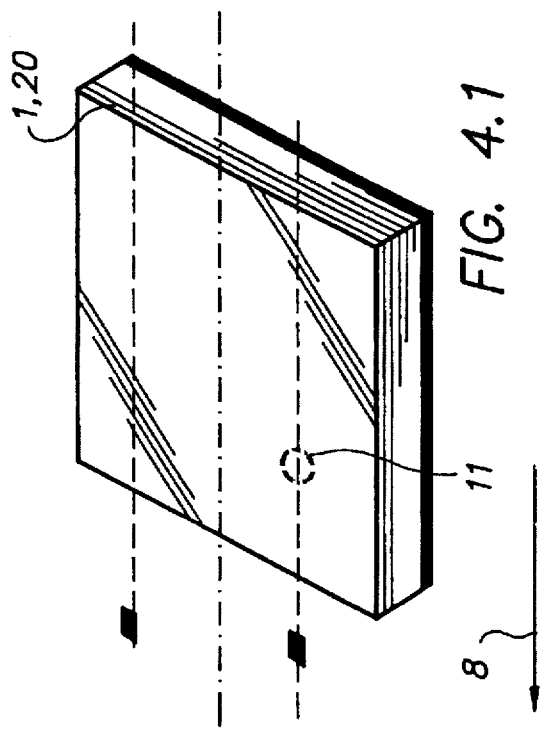
FIG. 4.1
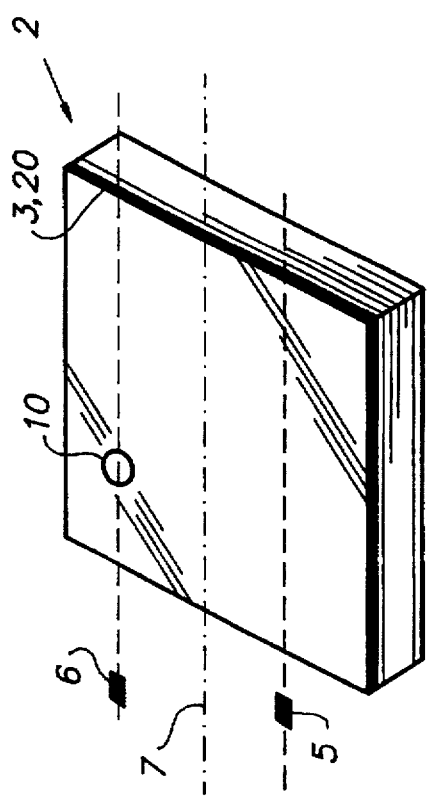
FIG. 4.2

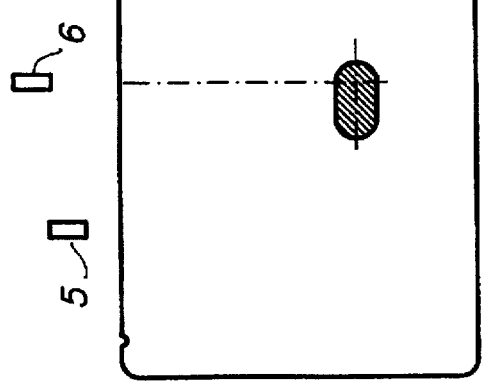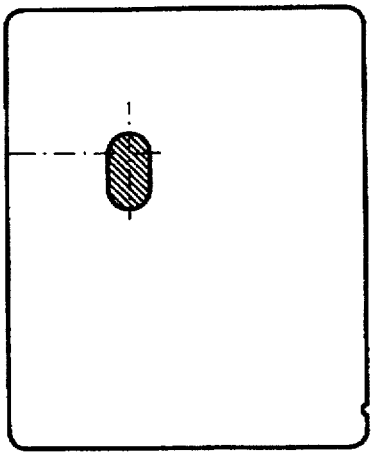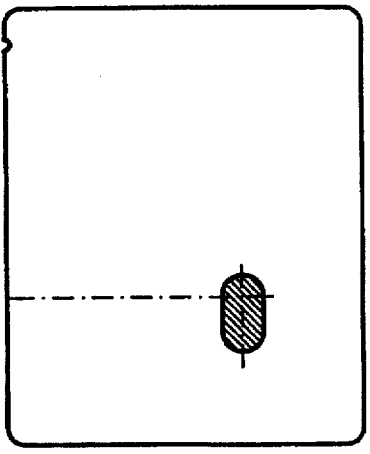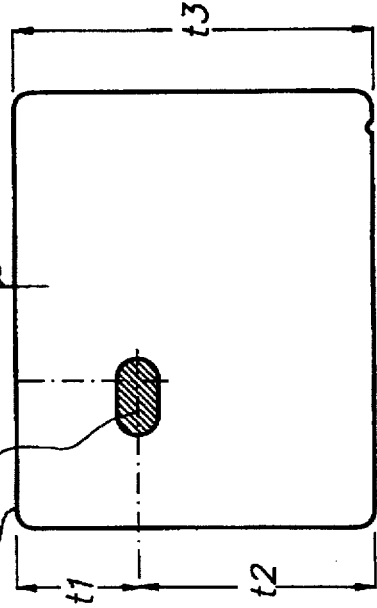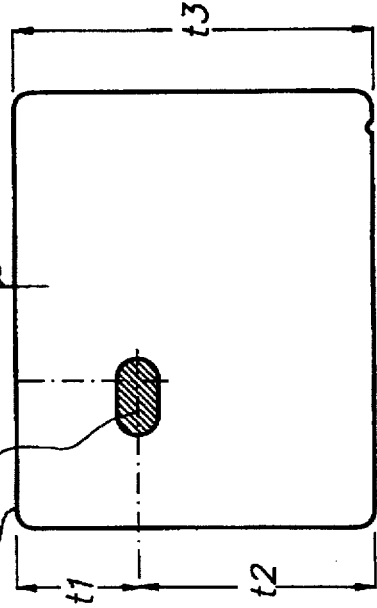
FIG. 7.4  FIG. 7.2  FIG. 7.3  FIG. 7.1

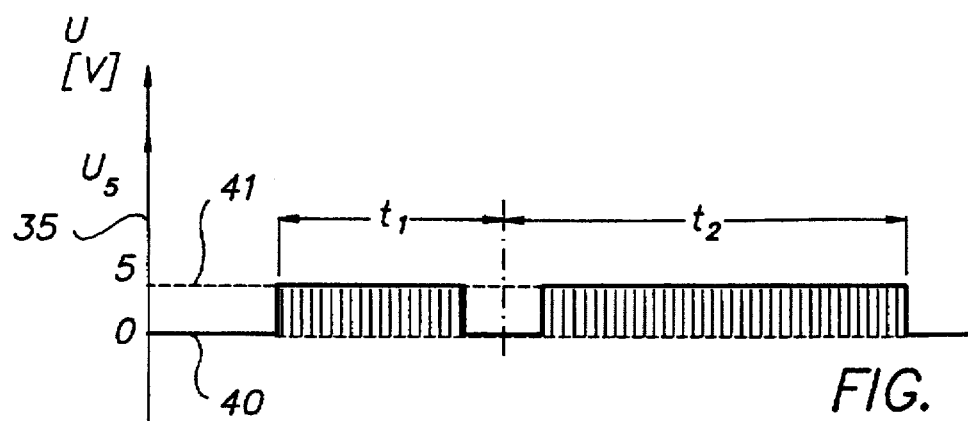
FIG. 8.1
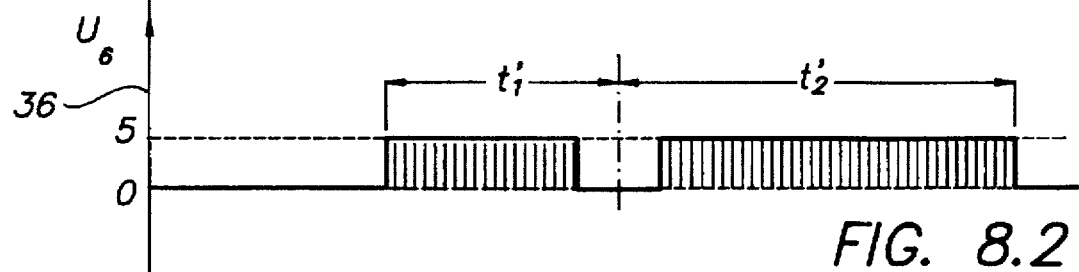
FIG. 8.2
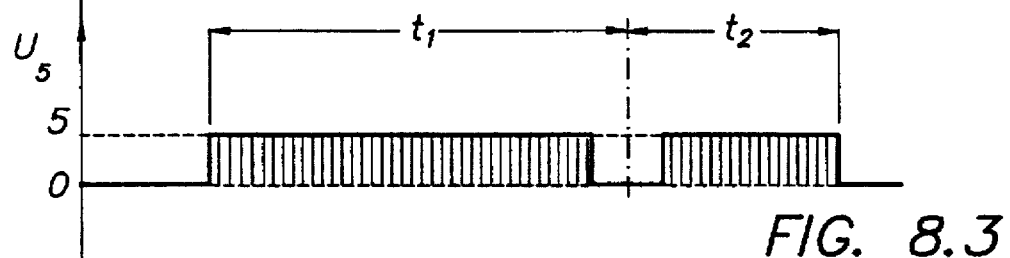
FIG. 8.3
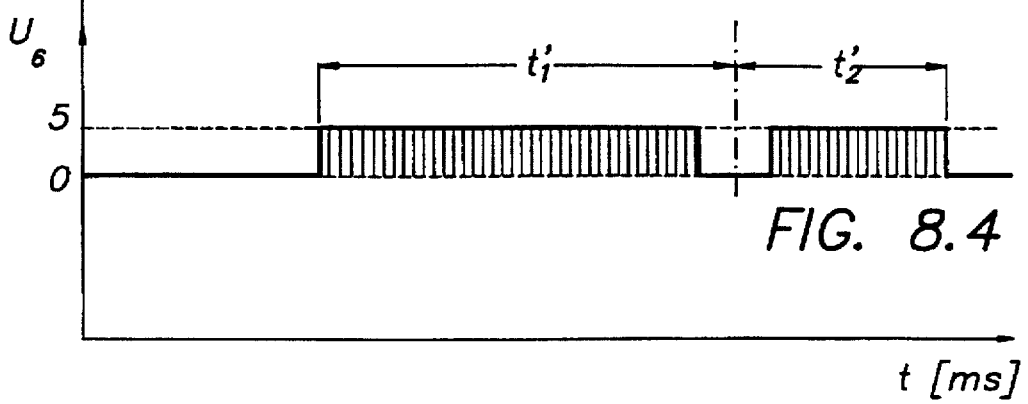
FIG. 8.4

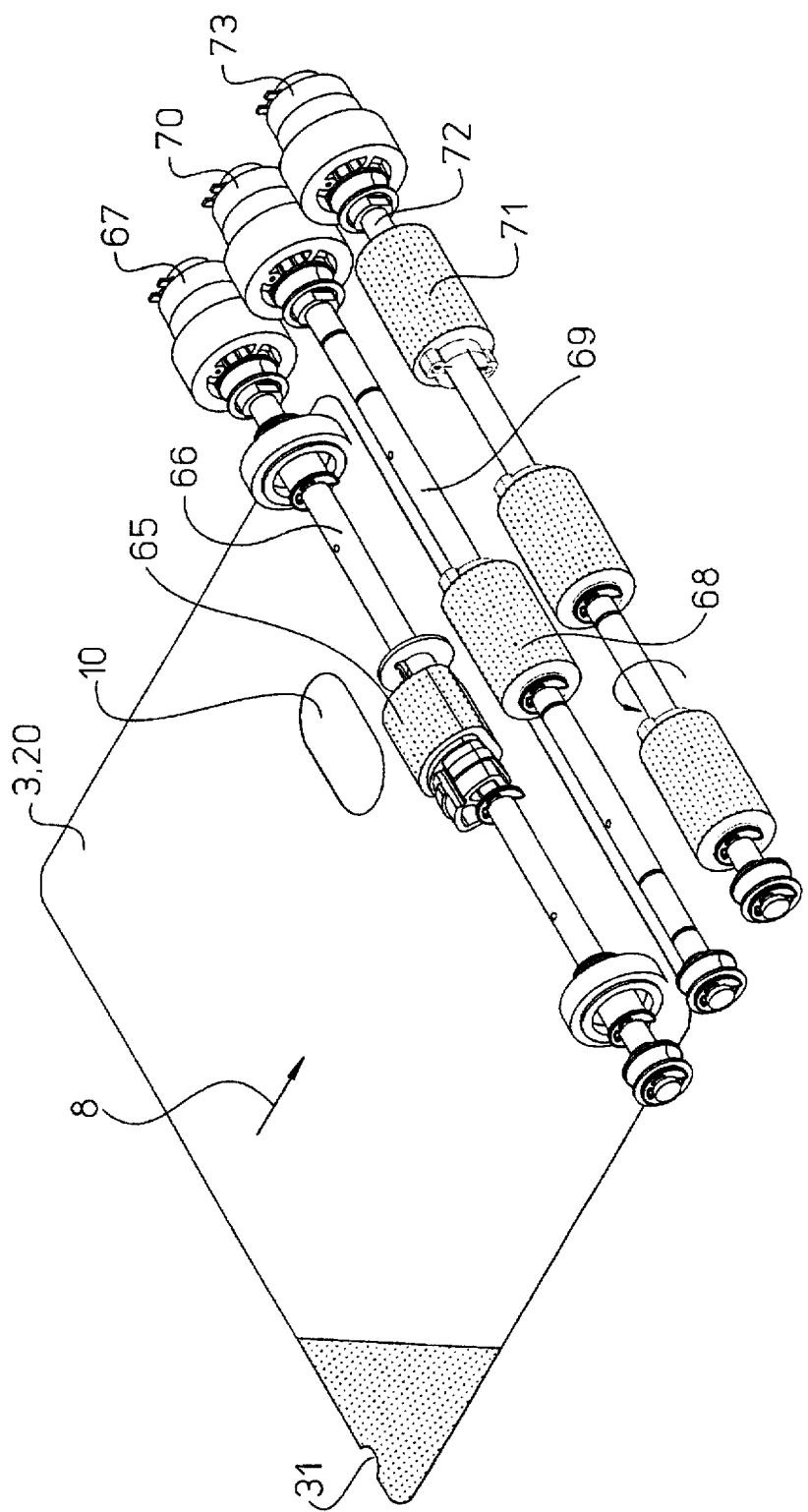

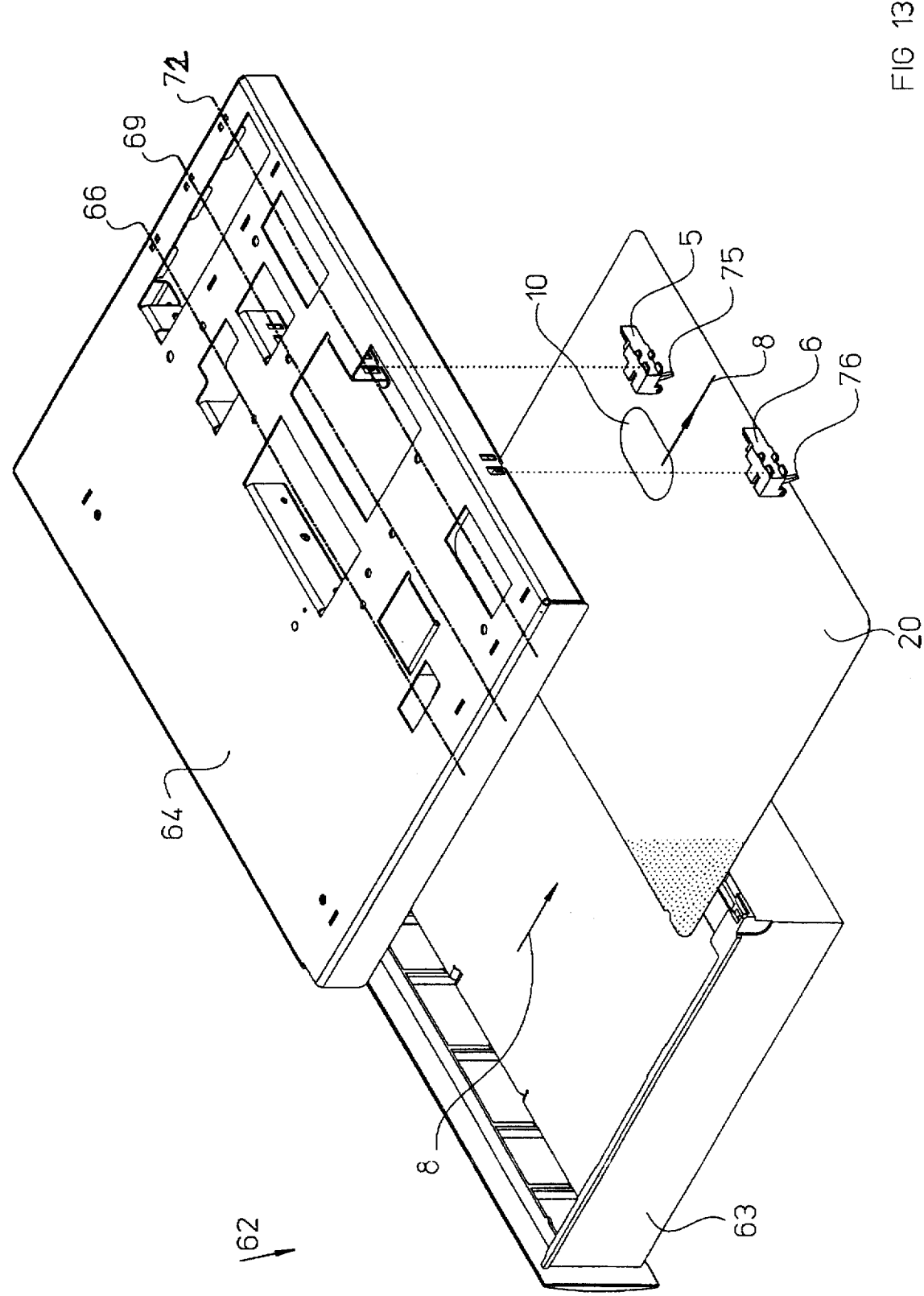

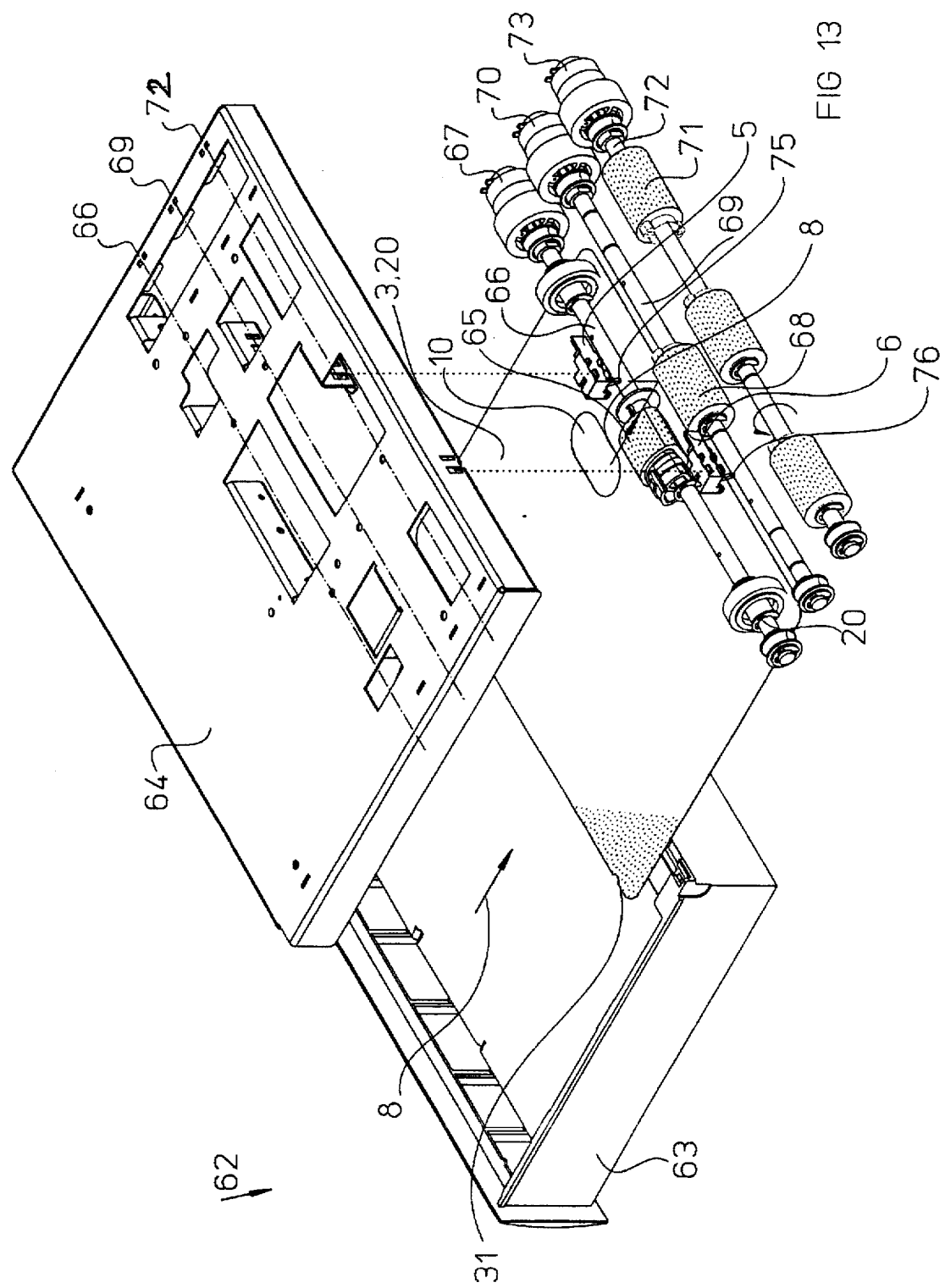

STACK OF IMAGE RECEIVING SHEETS WITH DETECTION MARK

FIELD OF THE INVENTION

The present invention relates to the loading of a stack of image receiving sheets which have to be protected from possibly being damaged by any mechanical impact (such as friction or finger prints e.g.) in a handling or a processing apparatus. More in particular, the invention relates to the loading of a stack of image receiving sheets in a thermal printer.

BACKGROUND OF THE INVENTION

Thermal transfer printing according to which a dye or pigment is transferred according to a heat pattern from a dye donor element to an image receiving sheet is a well established method for making colour images or black & white images. According to a particular interesting type of thermal transfer printing the amount of dye transferred can be controlled by the amount of heat supplied to the dye donor element. An image obtained according to this process thus will have multiple tones. Such process generally requires that the image receiving sheet contains an image receiving layer comprising a dye-able resin.

The latter process is generally also susceptible to finger prints on the image receiving side of the images. Such finger prints may alter the image receiving properties of the sheet so that the image may contain defects. To avoid finger prints being made on the image receiving side of a sheet while loading the printer with a stack of image receiving sheets (see FIG. 1), a cover sheet (see FIG. 2) is generally provided to protect the outermost image receiving sheet. Cover sheets that are being used for this purpose include ordinary paper and cardboard. Such cover sheet is manually removed by the operator from the stack of image receiving sheets once they are loaded in the printer. This method however is time consuming and furthermore may cause unwanted dust and possible damage to the image receiving sheets if it is not carried out with care.

Furthermore, it is possible that the image receiving sheets are wrongly loaded, i.e. with their image receiving layer upside while it should be down or vice versa. In the above method of loading the thermal printer there is no way that the printer can detect a false loading of the sheets.

OBJECTS OF THE INVENTION

It is an object of the present invention to provide a stack of image receiving sheets, each sheet having on a support an image receiving layer, that can be easily loaded in a printer without a risk of making finger prints on an image receiving layer.

It is a further object of the present invention to provide a stack of image receiving sheets, each sheet having on a support an image receiving layer comprising a dye-able resin wherein said stack has means detectable by a thermal printer for establishing whether or not they are correctly loaded in such printer.

Further objects of the present invention will become clear from the description hereinafter.

SUMMARY OF THE INVENTION

According to the present invention there is provided a stack of image receiving sheets, wherein each image receiving sheet comprises on one side of a support an image receiving layer, and wherein said stack includes a cover sheet protecting the image receiving layer of an outermost image receiving sheet characterised in that said cover sheet comprises a detection mark distinguishing it from said image receiving sheets.

According to the present invention there is further provided a sheet loader loaded with a stack of image receiving sheets, wherein each image receiving sheet comprises on one side of a support an image receiving layer comprising a dye-able resin, and wherein said stack includes a cover sheet protecting the image receiving layer of an outermost image receiving sheet, characterised in that said cover sheet comprises a detection mark distinguishing it from said image receiving sheets, and that said sheet loader includes a sensing means for detecting said cover sheet.

BRIEF DESCRIPTION OF THE DRAWINGS

The present invention will be illustrated by means of the following drawings, without however limiting the invention thereto.

FIGS. 3.1 and 3.2 show a first and a second embodiment of a stack of image receiving sheets including a cover sheet according to the present invention;

FIGS. 4.1 to 4.4 show in a perspective view the four possible ways of loading a stack of image receiving sheets including a cover sheet according to the present invention;

FIGS. 7.1 to 7.4 show the four possible orientations of a cover sheet in the printer as represented in FIG. 6;

FIGS. 8.1 to 8.4 show patterns of detection signals according to an improved embodiment of the present invention;

FIG. 12 is a cover sheet and a set of upper roller means of a sheet loader according to the present invention;

FIG. 13 is an exploded view of a cover sheet and a magazine of a sheet loader according to the present invention;

FIG. 14 is an exploded view of one embodiment of a sheet loader according to the present invention including a magazine according to FIG. 13 and upper rollers according to FIG. 12.

DETAILED DESCRIPTION OF THE INVENTION

Figure 1:
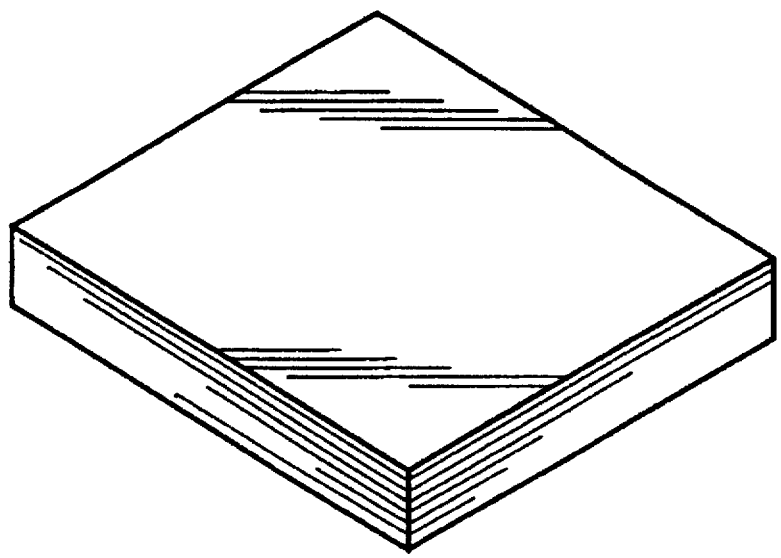
FIG. 1 is a conventional stack of image receiving sheets.
Figure 2:
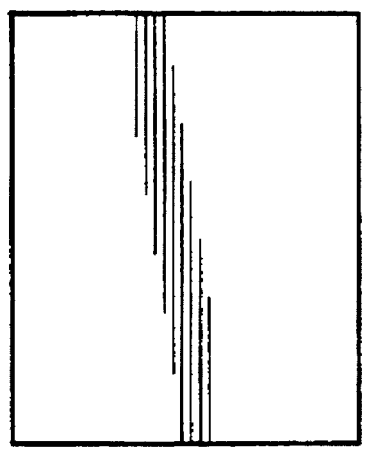
FIG. 2 is a conventional cover sheet.

A detection mark as used in accordance with the present invention is preferably a hole in the cover sheet or it can be an optically detectable mark, such as e.g. an opaque mark on a transparent cover sheet. The use of a hole as a detection mark offers the advantages that it can be detected with a cheap electro-mechanical switch. A separate optical detector can be used for distinguishing between opaque and transparent image receiving sheets that generally require different parameter settings of the thermal printer to obtain a good image.

With a stack of image receiving sheets in connection with the present invention there is understood that the image receiving sheets are stacked so that the back of one image receiving sheet contacts the frontside of another image receiving sheet comprising the image receiving layer. The stack will thus show on one side an image receiving layer of an image receiving sheet and on the opposite side the back of an image receiving sheet.

In FIG. 3.1 is shown a stack 2 of image receiving sheets 1 of which the side showing the image receiving layer of a sheet is protected with a cover sheet 3 (the edges of which have been illustrated in black) having a detection mark 4 in its center, according to one embodiment of the present invention. The detection mark 4 can be detected by a sensing means 5 positioned on the center axis 7 of the cover sheet 3 and longitudinally to the direction of transportation 8 as shown in FIG. 3.1 irrespective of how the stack was loaded in the printer. (The printer will be described later on with reference to FIG. 11).

Alternatively, when the sensing means 5 is not positioned on the center axis 7 but on an excentric axis 9 to the left or to the right of it, or in a quarter of the cover sheet 3, up to four detection marks 10 can be provided on the cover sheet 3 as shown in FIG. 3.2. Whereas in the case of a central detection mark 4 only one sensing means 5 is sufficient, in the case of a non-central detection mark 10, generally two sensing means 5 and 6 are necessary.

Once the cover sheet is detected by the printer it can be automatically ejected therefrom and the printer can then automatically load the image receiving sheet that follows the cover sheet or when the cover sheet is the last in the wrongly positioned stack, the printer can give an error signal, e.g. by a visual and/or an audible alarm.

A disadvantage of a central detection mark 4 is the fact that the printer cannot discriminate between a stack loaded with the cover sheet on top and a stack loaded with the cover sheet down. In one of these possibilities the image receiving sheets will come out wrongly and printing will be done on the back without this being noted.

According to a preferred embodiment therefore, illustrated in FIGS. 4.1 to 4.4, showing in a perspective view the four possible ways of loading a stack 2 of image receiving sheets 1 including a cover sheet 3 according to the present invention, a detection mark 10 is positioned in one quarter of the cover sheet 3. (For reason of greater clarity, the edges of the cover sheet 3 have been illustrated in black.) In connection with this embodiment two sensing means 5 and 6 are used, one of them being positioned to the left of the center axis 7 of the cover sheet, which axis is longitudinal to the direction of transportation 8 (shown by the arrow), and the other sensing means being positioned to the right thereof.

FIGS. 4.1 and 4.4 show the preferred loadings wherein the image receiving layers of the image receiving sheets 1 are faced down and consequently the cover sheet 3 is at the bottom of the stack 2, whereas FIGS. 4.2 and 4.3 show the opposite loadings. Supposing that FIGS. 4.1 and 4.4 are the correct loadings and 4.2 and 4.3 are wrong loadings, the printer should give an error signal when detecting one of the loadings 4.2 or 4.3.

Figure 5:
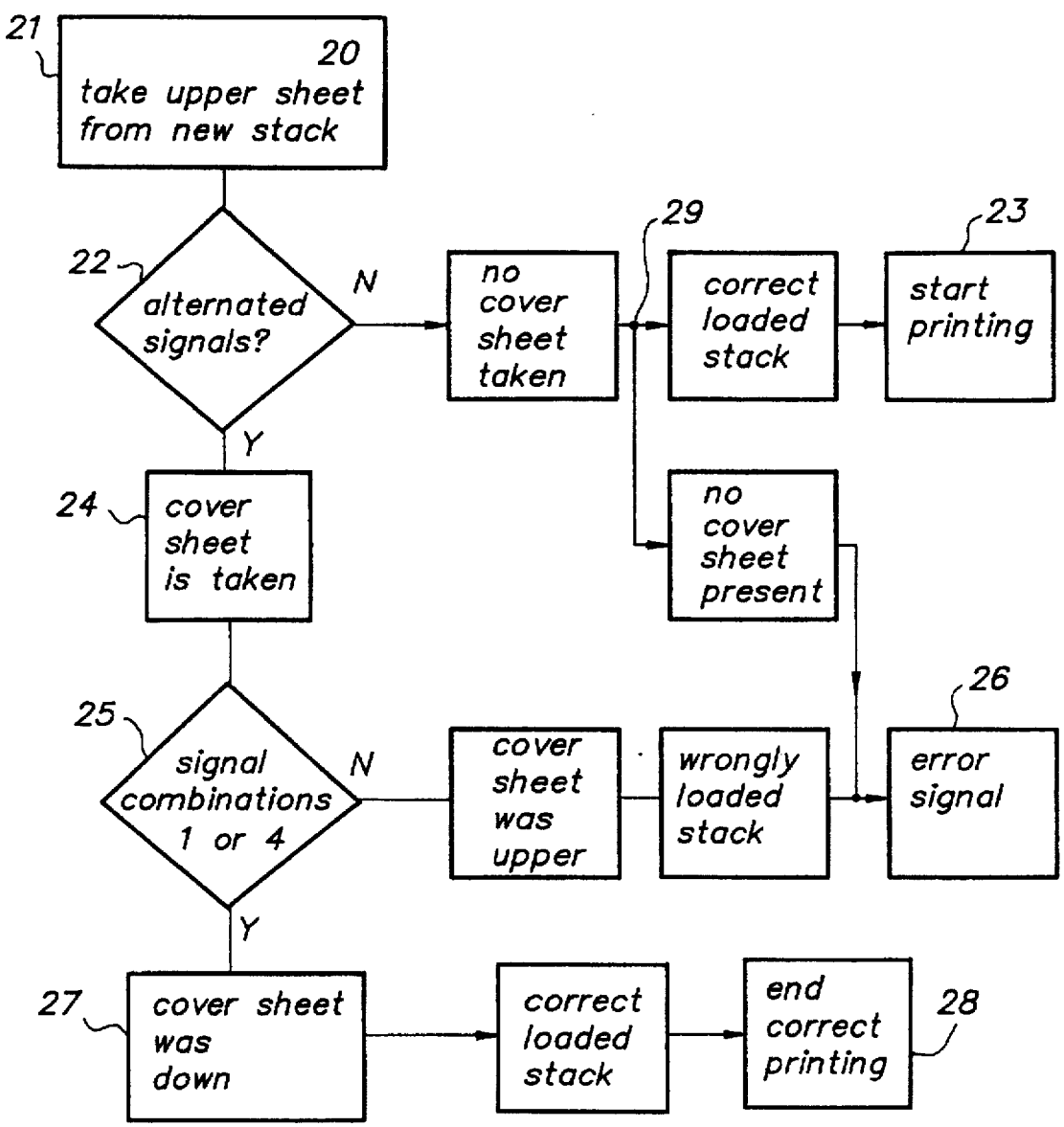
FIG. 5 is a flowchart of some principal steps included in a detection method according to the present invention.

FIG. 5 is a flowchart of some principal steps included in a control means, such as a detection method used in accordance with the present invention. A microcomputer (not shown) controls the printing process in accordance with a logical signals pattern provided by sensing means or detectors 5 and 6. Thus until a certain logical pattern from sensing means 5 and 6 matches a predetermined pattern, the microcomputer will provide alarm or warning signals to the operator. In a first step 21 an upper sheet 20, being either a cover sheet 3 or an image receiving sheet 1, is taken from the stack. While feeding said sheet into the printer, in step 22 a checking is made whether the sensing means 5 and 6 do receive alternative signals (as illustrated in FIG. 8, which will be discussed later) resulting from appropriate sensing means. If no alternation is received, this means that the taken sheet is not a cover sheet 3, further meaning that the stack 2 was located correctly, namely with the image receiving layers downwards. Thus a printing cycle may start as indicated in step 23.

Although the method of the present invention basically includes a cover sheet, in practice it might happen that no cover sheet is present in the stack e.g. as it was removed before. In such a situation, the intermediate decision 29 "correct loaded stack" has to be confronted with a alternative possibly "no cover sheet present". This failure may be overcome by further preferred embodiment, wherein two protective cover sheets are applied, one at the bottom of the stack of image receiving sheets and one at the top of said stack, both cover sheets having identical geometry and orientation.

However, the further description will be described with reference to only one cover sheet.

Instead, if indeed an alternated signal is received, this means that the first taken sheet is cover sheet 3 (ref step 24). Then a further checking 25 has to be made whether the sensing signals belong to a signal combination corresponding with FIG 4.1 or to a signal combination corresponding with FIG. 4.4. If not, this means that the first taken sheet 20 which was already defined in step 24 as being a cover sheet 3, was in the upper position of the stack 2, further meaning that the stack 2 was wrongly loaded and that an error signal 26 may be given. If the sensing signals belong to an signal combination corresponding with FIG. 4.1 or to a signal combination corresponding with FIG. 4.4, the cover sheet 3 was in the lowest position of the stack 2, further meaning that the stack 2 was correctly loaded and that the printing of the foregoing sheets is ended (step 28).

Additionally, the error signal 26 can be routed through electronic means to notify an operator that loads the image receiving sheets that the thermal printer is incorrectly loaded, or has ejected a non-printed sheet. Alarm means (not shown) can be included which provide visual indicators or audible signals to encourage correction of the problem by the operator.

Figure 6:
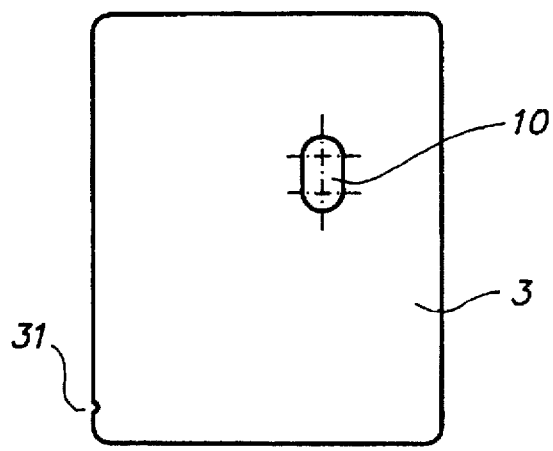
FIG. 6 is a third embodiment of a cover sheet according to the present invention.

Reference is made now to FIGS. 6 and 7, wherein FIG. 6 is a third embodiment of a cover sheet 3 according to the present invention; and wherein FIGS. 7.1 to 7.4 show the four possible ways of loading said cover sheet in the printer. A notch 31 made on an edge of each sheet, as well on each image receiving sheet 2 as on the cover sheet 3, is used to guide a person to correctly orient the stack 2 while loading it into the printer. However, this technique still allows for misprinting if the person loading the printer does not follow the correct instructions.

Detection of the four different loadings is preferably carried out using a hole 10 as detection mark and electro-mechanical switches for sensing means 5 and 6. Sensing means 5 will detect a time $t_1$ between the beginning or leading edge 32 of the cover sheet 3 and the detection mark 10 and a time $t_2$ between the detection mark 10 and the end or trailing edge 33 of the cover sheet 3 in case of the loadings according to FIGS. 7.1 and 7.3 (which also correspond with FIGS. 4.1 and 4.3), while sensing means 6 will only detect a time $t_3$ that lapses between the detection of the beginning 32 of the cover sheet and the end 33 of the cover sheet 3. In case of FIGS. 7.2 and 7.4 (also corresponding with FIGS. 4.2 and 4.4) sensing means 6 will detect the times $t_1$ and $t_2$, while in those cases sensing means 5 will detect time $t_3$. Assuming that the direction of transportation of the sheets proceeds as indicated by the arrow 8, it can be deducted from FIGS. 7.1 and 7.2 that $t_1$ will be shorter than $t_2$, whereas the opposite holds in case of loadings according to FIGS. 7.3 and 7.4.

Thus, by monitoring the times that the electro-mechanical switches 5 and 6 are open or closed when the sheets are fed at a constant rate, the printer will be capable of discriminating between a loading where the cover sheet 3 is on top of the stack 2 (see FIGS. 4.2 or 4.3) and a loading where the cover sheet 3 is at the bottom of the stack (see FIGS. 4.1 or 4.3 respectively correlating with a short time $t_1$ on sensor 5 or with a large time $t_1$, on sensor 6).

It will further be appreciated that in case the sheet being loaded is an image receiving sheet 1 both sensing means 5 and 6 will yield a time $t_3$ so that the printer is also capable of detecting whether the sheet is a cover sheet 3 or not. In case of FIGS. 7.1 and 7.2 the printer will not be capable of detecting in advance whether the sheets are turned 180° (cfr. flowchart in FIG. 6), since the cover sheet 3 is at the bottom of the stack 2. This however is generally of no importance.

If detecting in advance whether the stack was correctly loaded is important, a further improvement may be implemented. Indeed, in one further preferred embodiment, two protective cover sheets may be applied, one at the bottom of the stack of image receiving sheets and one at the top of said stack, both cover sheets having identical geometry and orientation.

However, the further description will be continued with reference to only one cover sheet.

If the orientation of the image receiving sheets is well important, a further improvement may be implemented. Indeed, in one further preferred embodiment, the combined signals of the sensing means 5 and 6 are further discriminated by electronic means. Reference is made to FIGS. 8.1 to 8.4, which show combined patterns of detection signals according to such an improved embodiment of the present invention. For sake of greater clarity, the situation in FIG. 8.1 corresponds with that in FIG. 6.1 and with that of FIG. 4.1; idem for FIGS. 8.2 to 8.4.

In FIG. 8, the signal 35 from sensing means 5 and the signal 36 from sensing means 6 attain either a low level 40 (e.g. 0 Volt) or a high level 41 (e.g. 5 Volt) during respectively the above mentioned times $t_1$, $t_2$ or $t_3$ ($t_3$ is a continuous pulse and for reason of simplicity not shown separately in these figures) for sensing means 5, or corresponding times $t_1$, $t_2$, and $t_3$, for sensing means 6. As the four different combined patterns of detection signals from FIGS. 8.1 to 8.4 definitely are different, a clear difference can be made regarding the exact orientation of the cover sheet 3 and answering the question whether the cover sheet is turned 180° or not.

By itself, the sensing means 5 and 6 can be used to verify whether or not the cover sheet 3 is correctly oriented by detecting the presence or absence of a detection hole 10. It is preferably, however, to also include an edge sensing means (not shown) to detect a leading edge 32 of each sheet. This provides a precise starting time for detecting the detection hole 10 within a predetermined period of time after the leading edge 32 of the sheet is detected. In other words, the occurrence of a combination of a first signal from an edge sensing means and a signal from sensing means 5 and 6 within a predetermined amount of time before the trailing edge 33 of a sheet is noted, indicates the correct orientation of the sheet.

If the detection mark on the cover sheet 3 is not a hole 10, but an optically detectable mark, another way of detection can make use of a combination with two illuminating means, e.g. two LEDs, and two corresponding sensing means. The cover sheet 3, containing a detection mark, may be transparent or may be opaque, corresponding respectively with a detection mark which itself is either opaque or transparent to the LEDs used for illuminating the detection mark. Light emitted by these LEDs passing through or reflected by the detection mark on the cover sheet 3 is detected by apt photodetectors. These photodetectors provide a logical signal "low" or "high" (cfr. referals 40 and 41 in FIG. 8), depending on whether the intensity of the detected light is above or below (or vice versa) a threshold value, to a microcomputer. This microcomputer can use the logicals coming from sensing means to control the printing process.

Cover sheets suitable for use may be transparent or opaque and are preferably sheets that cause little or no dust when taken out of the stack. Particularly suited for this purpose are plastic sheets such as e.g. a polyester sheet or a paper coated on both sides with a polymer such as e.g. polyethylene coated paper. According to a particular interesting embodiment in connection with the present invention the cover sheet is an image receiving sheet provided with a detection mark to distinguish it from the other image receiving sheets (cfr. FIG. 6).

Due to the fact that the dye donor element, which comprises on a support a dye layer containing a dye being thermally transferable, is generally specifically adapted to a particular type of image receiving sheets, a dye donor element is preferably included in a package 100 together with a stack of image receiving sheets for use with said dye donor element. As shown in FIG. 9A, the package 100 thus contains two subpackages, one 101 for a dye donor element and one 102 for a stack of image receiving sheets.

Figure 9:
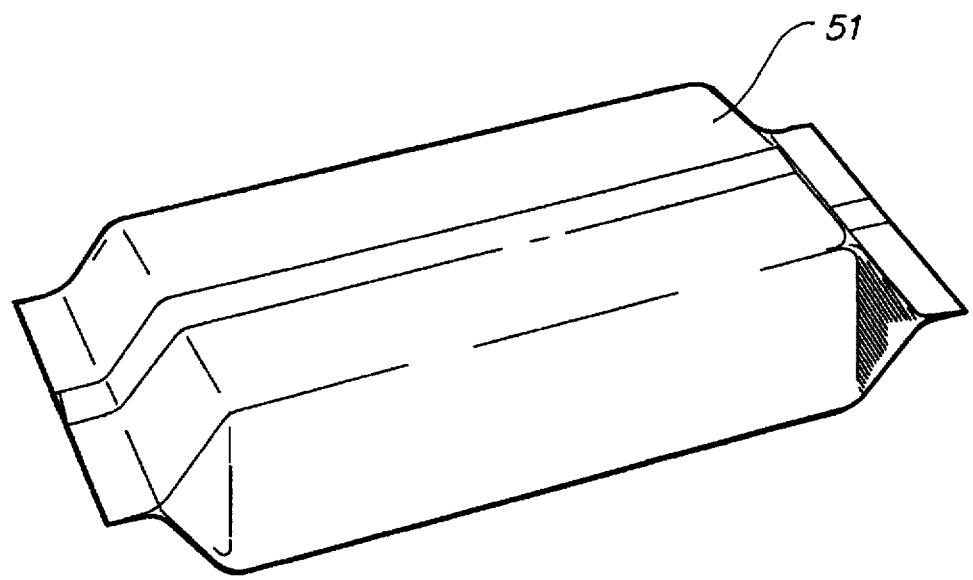
FIG. 9 is a sealed package containing a dye donor element and a disposable cassette.
Figure 10:
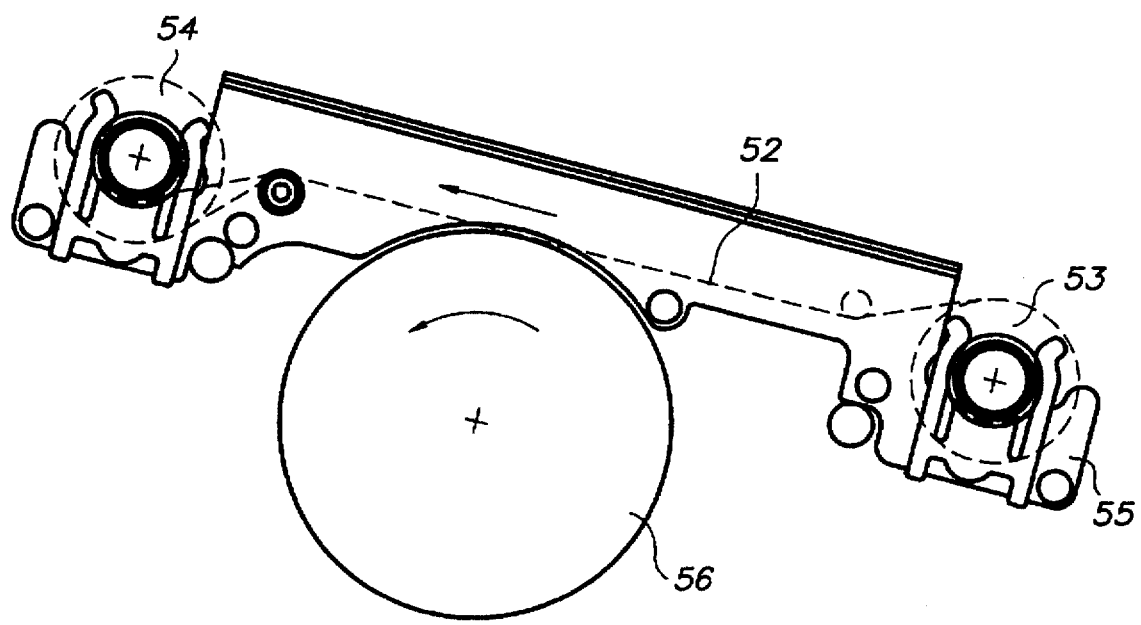
FIG. 10 is an unpacked cassette provided with a dye donor element and placed in a thermal printer.
Figure 9A:
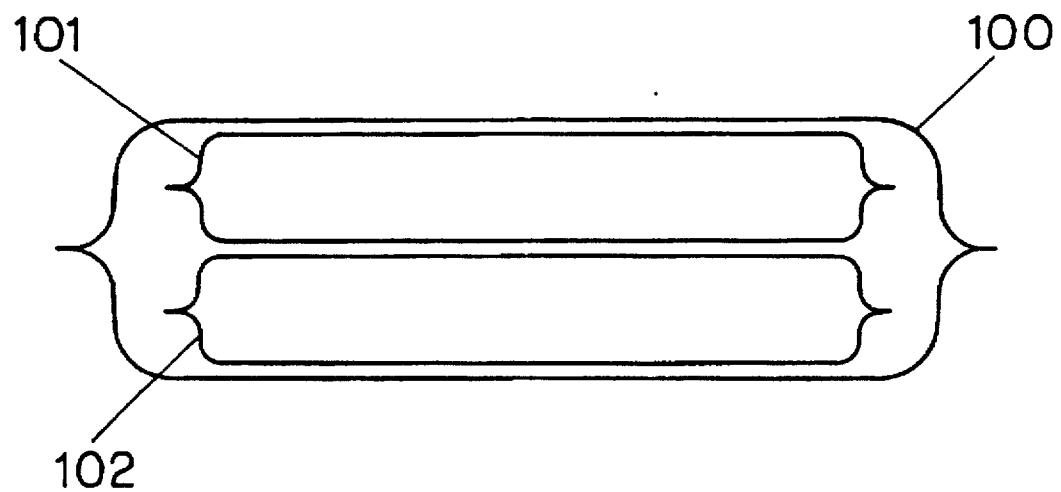
FIG. 9A is a cross-section of a sealed package containing two separate packages, one which contains a dye donor element and one of which is contains a stack of image receiving sheets.

Reference is made now to FIGS. 9 and 10, wherein FIG. 9 is a sealed package containing a dye donor element and a disposable cassette; and FIG. 10 is an unpacked cassette provided with a dye donor element and operating in a thermal printer. FIG. 9 illustrates a first subpackage 51 as disclosed in application EP 0 593 821 A1 containing a dye donor element 52 in the form of a web-type dye carrier paid out from a supply spool 53 and rewound on a take-up spool 54, both spools being provided in a disposable cassette 55 for ease of handling. A stripped form of a reloadable cassette 55 which can be used in the method according to the same invention EP 0 593 821 A1 is schematically shown in FIG. 10, the cassette 55 being in contact with the printing drum 56. A second subpackage containing a stack 2 of image receiving sheets 1 is not illustrated separately for reasons of simplicity.

Figure 11:
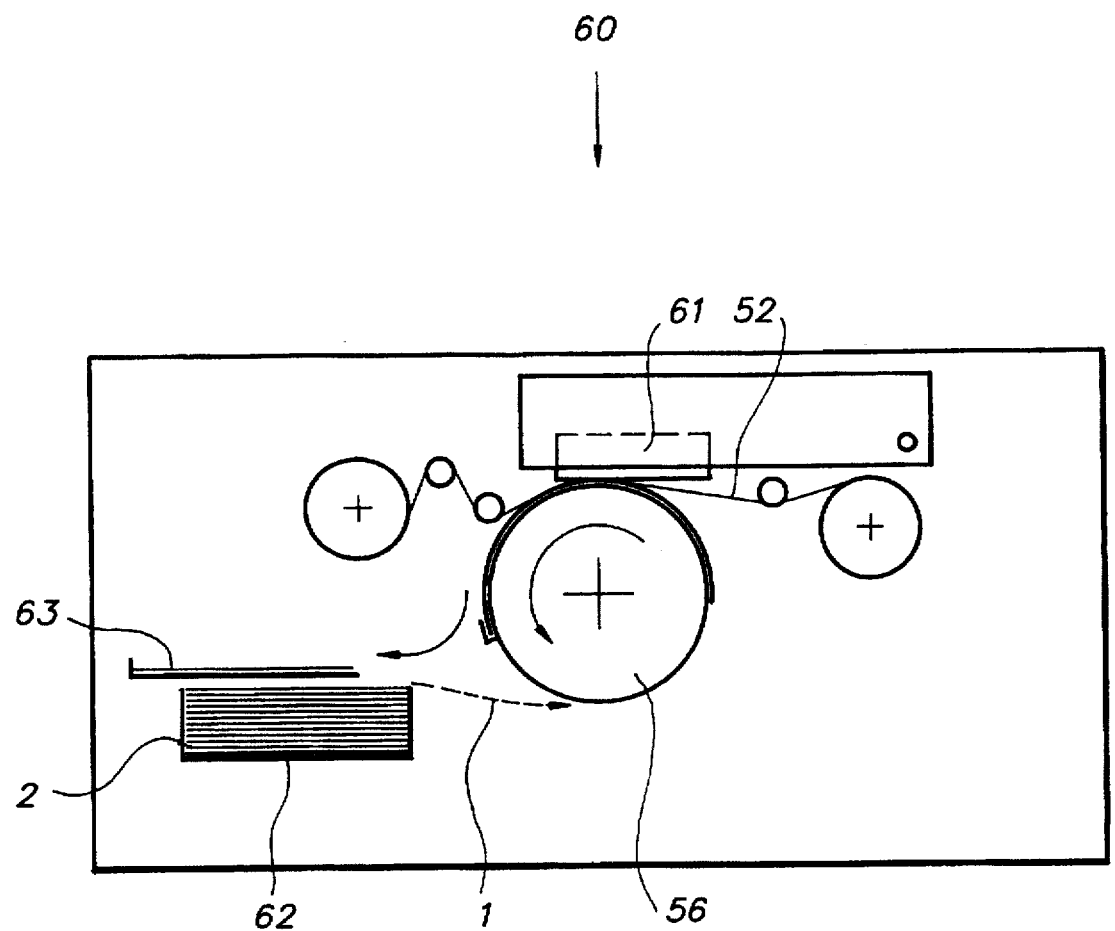
FIG. 11 shows a thermal printer fitted for operating according to the present invention.

FIG. 11 shows a thermal printer fitted for use according to the present invention. The apparatus 60 generally comprises a cylindrical printing drum 56 which functions to support and transport an image receiving sheet 1 through a print zone where it receives thermally printed information. A dye-bearing donor ribbon 52 is advanced through the print zone between the image receiving sheet 1 and a thermal print head 61. Thermal head 61 spans the printing drum 56 and comprises a linear array (not shown) of closely spaced resistive heating elements, each being independently addressable with image information supplied by a microprocessor. As each heating element is addressed, it heats that portion of the donor web 52 directly opposite, thereby causing dye to transfer from the donor ribbon 52 to the image receiving sheet 1.

The image receiving sheets 1 are fed to the drum 56 from a sheet loader 62 and are laid down in an output tray 63, which has been illustrated within the apparatus 60 but which may be located in front of the apparatus 60 as well.

According to the present invention there is further provided a sheet loader 62 being loaded with a stack 2 of image receiving sheets 1, each image receiving sheet 1 comprising on one side of a support an image receiving layer comprising a dye-able resin, said stack 2 including a cover sheet protecting the image receiving layer of an outermost image receiving sheet 1, said cover sheet 3 comprising a detection mark distinguishing it from said image receiving sheets, said sheet loader 62 including a sensing means for detecting said cover sheet 3.

Particularities of said sheet loader 62 will be explained in reference to the detailed drawing of FIGS. 12, 13 and 14. FIG. 12 illustrates a cover sheet and a set of upper roller means of a sheet loader according to the present invention; FIG. 13 illustrates a magazine or loading tray of a sheet loader according to the present invention; and FIG. 14 illustrates in an exploded view, partly broken away, one embodiment of a sheet loader according to the present invention including a magazine according to FIG. 13 and upper rollers according to FIG. 12.

According to the present invention, in a first step 21 (cfr. FIG. 5) an upper sheet 20, being either a cover sheet 3 or an image receiving sheet 1, is taken from a stack 2 of image receiving sheets 1 having a notch 31 stacked within the loading tray. This take is carried out by feeding rollers 65 on a feeding rollers axis 66, which itself may be selectively activated by e.g. an electromagnetic coupling 67 to a controlled electromotor (not shown). In order to guarantee that only one sheet 20 will be processed by the apparatus 60, an upper separating roller 68 on a separating roller axis 69, which itself may be selectively activated by e.g. an electromagnetic coupling 70 to a controlled electromotor (not shown) and a cooperating lower separating roller (not shown for reason of clarity) are operating at some distance from the feeding rollers 65. If occasionally two or more sheets 20 would have been taken by the feeding rollers 65, now the counteracting separating rollers 68 will only let pass the uppermost sheet 20 into the apparatus 60, as the lower separating roller is driven in a direction opposite to the feeding direction 8.

Each sheet 20 which is thus passing the feeding rollers 65 and the separation rollers 66 still has to be controlled as regarding the exact position or "registering" in the apparatus 60. In order to correct every possible skewness of such sheet 20, a set of upper registering rollers 71, on a registering roller axis 72, which itself may be selectively activated by e.g. an electromagnetic coupling 73 to a controlled electromotor (not shown) and a cooperating lower registering roller (not shown for reason of clarity) are operating at some further distance of the above mentioned rollers 65, 68.

FIG. 13 illustrates a magazine or loading tray of a sheet loader 62 used for holding and then sequentially feeding each sheet 20 into the thermal printer 60 with an exploded view of a sheet 20, the bottom part 63 and the upper part 64 of said magazine. Also indicated in FIG. 13 are the positions of the feeding roller axis 66, the separating roller axis 69, the registering roller axis 72, the main openings in the upper part 64 of the magazine, the sensing means 5 and 6 (here two electromechanical microswitches) and the direction 8 of feeding a sheet 20 into the printing apparatus 60.

In operation, the image receiving sheets 1 and the cover sheet 3 are stacked within the loading tray 62 by an operator. The switches 5 and 6 are disposed to the upper plate 64 of the tray 62 and are positioned thus to be able to check if the sheets 20 are correctly loaded. Therefore, when the sensing means 5 and 6 detect that a sheet 20 is properly loaded because the lever 75 or 76 of the microswitches 5 or 6 is moving within the detection hole 10, it permits the feeding roller axis 66 to rotate in a direction 8 to frictionally move the top sheet 20 of the stack 2 from the tray 63 into the printer 60. When the levers 75 and 76 are not moving correctly in the detection hole 10 because of a misloading of sheet 20, the sensing means 5 and 6 either raise an alarm or prevent the sheet 20 from being fed into the printer 60. In this manner, the mechanical sensing means 5 and 6 ensure that the surface of the image receiving sheets 1, including the image receiving layer thereon, is properly oriented in the loading tray 62 in accordance with the present invention.

FIG. 14 is an exploded view of one embodiment of a sheet loader according to the present invention including a magazine according to FIG. 13 and upper rollers according to FIG. 12. The identified structural elements of FIG. 14 are similar in structure and in operation to those of the correspondingly numbered structural elements described in relation to the FIGS. 12 and 13, and, hence, require no further description.

It is to be appreciated that the specific embodiments of the present invention as described above, are merely illustrative of the general principles of the invention. Various modifications will become possible for those skilled in the art after receiving the teachings of the present disclosure without departing from the scope thereof. For example, the above mentioned detection mark may be formed by a hole with a rectangular, or a square, or a triangular or a curved shape and the detection mark can be placed within the surface of the cover sheet or at a straight edge of the cover sheet.

This invention may be used as well for monochrome thermal sublimation printing as well as for colour thermal sublimation printing.

Further, the printing is not limited to a method employing a thermal head, but can also be applied in other technologies, such as resistive ribbon printing or laser printing.

More general, the present invention may be applied to any loading of a stack of image receiving sheets which have to be protected from possibly being damaged by any mechanical impact (such as friction or finger prints e.g.) in a handling or a processing apparatus.

We claim:

1. A combination of a processing apparatus, having a sensing means and a control means, and a stack of image receiving sheets, wherein each image receiving sheet comprises on one side of a support an image receiving layer comprising a dye-able resin, and wherein said stack includes a cover sheet protecting the image receiving layer of an outermost image receiving sheet, said cover sheet further comprising a detection mark located at the center of said cover sheet for distinguishing it from said image receiving sheets, the presence of said detection mark being detectable by said sensing means, and converted by said control means into an indication to said processing apparatus that said stack is correctly positioned.

2. A stack of image receiving sheets according to claim 1, wherein said detection mark is a hole in said cover sheet.

3. A combination of a processing apparatus, having a sensing means and a control means, and a package including a dye donor element comprising on a support a dye layer containing a thermally transferable dye and a stack of image receiving sheets for use with said dye donor element wherein each of said image receiving sheets comprises on one side of a support an image receiving layer comprising a dye-able resin, and wherein said stack includes a cover sheet protecting the image receiving layer of an outermost image receiving sheet, said cover sheet further comprising a detection mark located at the center of said cover sheet for distinguishing it from said image receiving sheets, the presence of said detection mark being detectable by said sensing means, and converted by said control means into an indication to said processing apparatus that said stack is correctly positioned.

4. A package according to claim 3, wherein said detection mark is a hole in said cover sheet.

* * * * *